(12) United States Patent
Stover et al.

(10) Patent No.: US 6,366,429 B1
(45) Date of Patent: Apr. 2, 2002

(54) PATTERNED AND DIRECTIONAL SELECTIVE ROUGHENING OF A SLIDER AIR-BEARING SURFACE

(75) Inventors: Lance Eugene Stover, Eden Prairie; Maher Abdullah Alodan, Bloomington; Daniel Paul Burbank, Minneapolis; Dale Eugene Egbert, Deephaven; Zine Eddine Boutaghou, Vadnais Heights, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/246,920

(22) Filed: Feb. 9, 1999

Related U.S. Application Data

(60) Provisional application No. 60/078,844, filed on Mar. 20, 1998.

(51) Int. Cl.[7] .................................................. G11B 5/60
(52) U.S. Cl. ................................................... 360/236.6
(58) Field of Search .......................... 360/235.8, 236.6, 360/237, 236.3, 236.5, 235.7

(56) References Cited

U.S. PATENT DOCUMENTS 4,894,740 A * 1/1990 Chhabra et al. ............ 360/103
5,991,118 A * 11/1999 Kasamatsu et al. ......... 360/103
6,021,024 A * 2/2000 Akiyama et al. ........... 360/103

* cited by examiner

Primary Examiner—Robert S. Tupper
(74) Attorney, Agent, or Firm—Schwegman, Lundberg, Woessner & Kluth, P.A.

(57) ABSTRACT

An information handling system, such as a disk drive, including a base, a disk stack rotatably attached to the base, and an actuator assembly movably attached to the base. The actuator assembly also includes a load spring and a slider attached to said load spring. The slider and load spring are attached to form a gimballing connection between the slider and the load spring. The slider includes an air-bearing surface which has a contact area. The slider also includes a transducer. The transducer is typically located near said contact area. The contact area includes a roughened surface portion and a smooth surface portion. The smooth surface portion is adjacent the transducer. The roughened surface portion is rougher than the smooth surface portion. The roughened surface portion is also rougher than the other surfaces associated with the air-bearing surface of the slider. The roughened surface portion of the contact area is formed by one of several techniques. One of the techniques uses a wet etch to remove at least one of the phases of a multi-phase material. Another technique defines the area to be roughened using photolithography. After exposing the photoresist using either a mask or a laser, a portion of photoresist is removed and the areas unprotected by photoresist are dry etched to form the roughened contact area.

28 Claims, 8 Drawing Sheets

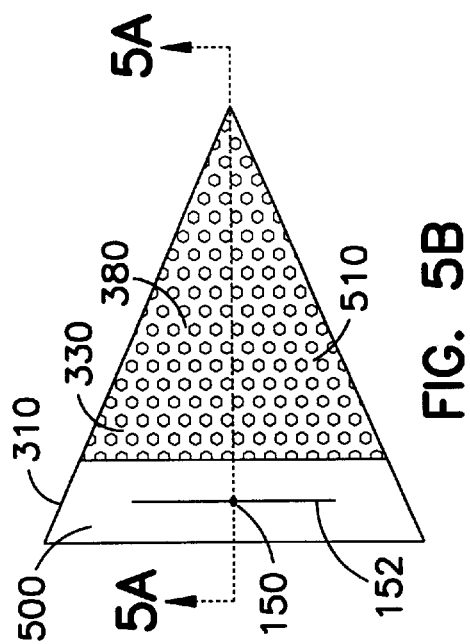
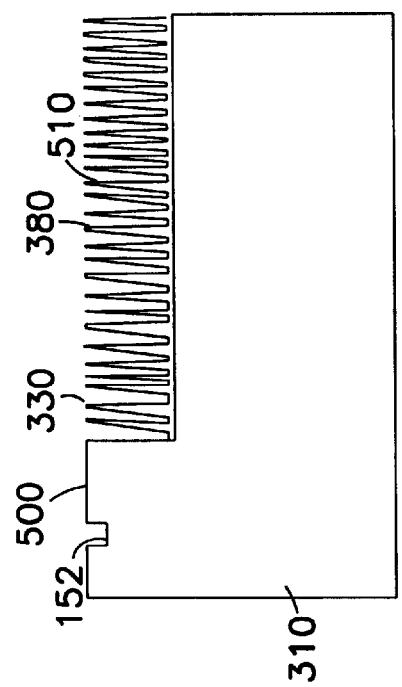

PATTERNED AND DIRECTIONAL SELECTIVE ROUGHENING OF A SLIDER AIR-BEARING SURFACE

RELATED APPLICATION

This application claims the benefit of U.S. Provisional Application Ser. No. 60/078,844, filed Mar. 20, 1998 under 35 USC119(e).

FIELD OF THE INVENTION

The present invention relates to the field of mass storage devices. More particularly, this invention relates to a disk drive which includes a slider having a roughened air-bearing surface.

BACKGROUND OF THE INVENTION

One of the key components of any computer system is a place to store data. One common place for storing data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk. The magnetic transducer translates electrical signals into magnetic field signals that actually record the data "bits."

The transducer is typically housed within a small ceramic block called a slider. The slider is passed over the rotating disk in close proximity to the disk. The transducer can be used to read information representing data from the disk or write information representing data to the disk. When the disk is operating, the disk is usually spinning at relatively high revolutions per minute ("RPM"). A current common rotational speed is 7200 RPM. Rotational speeds in high-performance disk drives are as high as 10,000 RPM. Higher rotational speeds are contemplated for the future.

The slider is usually aerodynamically designed so that it flies on the cushion of air that is dragged by the disk. The slider has an air-bearing surface ("ABS") which includes rails and a cavity between the rails. The air-bearing surface is that surface of the slider nearest the disk as the disk drive is operating. Air is dragged between the rails and the disk surface causing an increase in pressure which tends to force the head away from the disk. Simultaneously, air rushing past the depression in the air-bearing surface produces a lower than ambient pressure area at the depression. This vacuum effect counteracts the pressure produced at the rails. The opposing forces equilibrate so the slider flies over the surface of the disk at a particular fly height. The fly height is the thickness of the air lubrication film or the distance between the disk surface and the transducing head. This film minimizes the friction and resulting wear that would occur if the transducing head and disk were in mechanical contact during disk rotation.

The best performance of the disk drive results when the slider is flown as closely to the surface of the disk as possible. In operation, the distance between the slider and the disk is very small; currently "fly" heights are about 1–2 micro inches.

Information representative of data is stored on the surface of the memory disk. Disk drive systems read and write information stored on tracks on memory disks. Transducers, in the form of read/write heads attached to the sliders, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held accurately during a read or write operation using the servo information.

One of the most critical times during the operation of a disk drive occurs just before the disk drive shuts down or during the initial moment when the disk drive starts. When shutdown occurs, the slider is typically flying over the disk at a very low height. Just before shutdown, the slider is moved to a non-data containing area of the disk where it is landed. During landing, the slider skids to a stop. When the disk drive starts, the slider skids across the non-data containing portion of the disk until the velocity of the slider is sufficient to produce lift between the slider and the disk.

In the past, the surface of the disk was textured to keep contact points between the disk and the slider to a minimum. Currently, it has been found that disks with smooth surfaces have better magnetic characteristics. The recording density of the disk is highest when the spacing between the transducing head and the magnetic layer is minimized. By reducing the roughness or texturing on the disk, the spacing between the transducing head and the magnetic layer on the disk can also be reduced. When smooth sliders are landed on disks formed with a smooth surface, problems occur. One of the larger problems is that a stiction force occurs between the slider and the disk surface. Stiction is static friction and is proportional to the size of a meniscus formed by the lubricant on the disk. When a smooth slider lands on a smooth disk, the stiction forces are high. In some instances, the stiction forces may cause the slider to separate from the suspension. In other words, the stiction forces are so high that the slider rips from the suspension to which it is mounted.

One solution includes reducing the contact area of the air-bearing surface. However, even when this is done, frictional forces due to stiction remain and affect the performance of the air-bearing surface and slider. Evidence of air-bearing instability has been observed.

Thus, there is a need for a method and apparatus for reducing the stiction forces produced between the surface of the disk and the slider. There is also a need for a method and apparatus that allows for use of a smooth disk so that the spacing between the transducing head associated with the slider and the disk can be controlled and kept to a minimum to provide for an enhanced recording density of the information stored on the disk. There is also a need for a method and apparatus that provides for reduced stiction forces and yet still provides a stable air-bearing surface and slider. The method must also produce an air-bearing that is rugged and durable enough to last for the life of the disk drive. The method and apparatus must also be made of materials with minimal outgassing so that contaminants will not be added to the disk drive enclosure which could contaminant the lubricant on the disk.

SUMMARY OF THE INVENTION

An information handling system, such as a disk drive, includes a base, a disk stack rotatably attached to the base, and an actuator assembly movably attached to the base. The actuator assembly also includes a load spring and a slider attached to said load spring. The slider and load spring are attached to form a gimballing connection between the slider and the load spring. The slider includes an air-bearing surface which has a contact area. The slider also includes a transducer. The transducer is typically located near said contact area. The contact area includes a roughened surface portion and a smooth surface portion. The smooth surface portion is adjacent the transducer. The roughened surface portion is rougher than the smooth surface portion. The roughened surface portion is also rougher than the other surfaces associated with the air-bearing surface of the slider.

The roughened surface portion of the contact area is formed in one of several ways. If the slider is comprised of a multi-phase material, a selective etchant can be applied to the contact area for a selected amount of time. The selective etchant will act to remove a portion of at least one of the phases of the material and will be less active or inactive in removing at least another of the phases of the material. The amount of material removed using the selective etchant will be determined by the concentration of the etchant as well as the amount of time the etchant is left on the surface of the multi-phase material. The grain size of the materials used in the multi-phase material can also be used to determine the surface roughness of the contact portion. If the body of the slider is made of a single-phase material, this technique requires removal of a portion of the contact area of the air-bearing bearing surface. The next step includes depositing an etchable multi-phase material on the portion of the contact area. The selective etchant is then applied to the multi-phase phase material at the contact area. At least one of the phases is removed by the selective etchant to form a roughened surface. The selective etchant is typically a wet or chemical etchant that reacts with one of the phases of the multi-phase material.

The other process is a dry process that can be used on any material. Photoresist is applied to the contact area. The photoresist is exposed and developed in certain areas to form a defined pattern across the contact area. Dry etch removal techniques are then used to remove material of the slider such that the defined pattern is transferred onto the slider. The photolithography technique using a dry etch works on both single-phase and multi-phase materials.

Advantageously, a roughened portion of the contact surface reduces the stiction forces produced between the surface of the disk and the slider and allows landing of a slider onto a smooth disk. Furthermore, since a smooth disk can be used the spacing between the transducing head associated with the slider and the disk can be controlled and minimized to provide for an enhanced recording density of the information stored on the disk. The roughened contact area of the air-bearing surface not only reduces stiction forces between the disk and the slider, but also provides a stable air-bearing surface for the slider. The resulting air-bearing is rugged and durable. The materials used to form the roughened surface are removed so the only materials remaining are those already in the drive. Thus, outgassing problems are minimal.

BRIEF DESCRIPTION OF THE DRAWINGS

FIG. 5A is a cutaway side view along line 5A—5A of the center island portion of the slider air-bearing surface shown in FIG. 5B.

FIG. 5B is a top view of the center island portion of the slider air-bearing surface after roughening.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
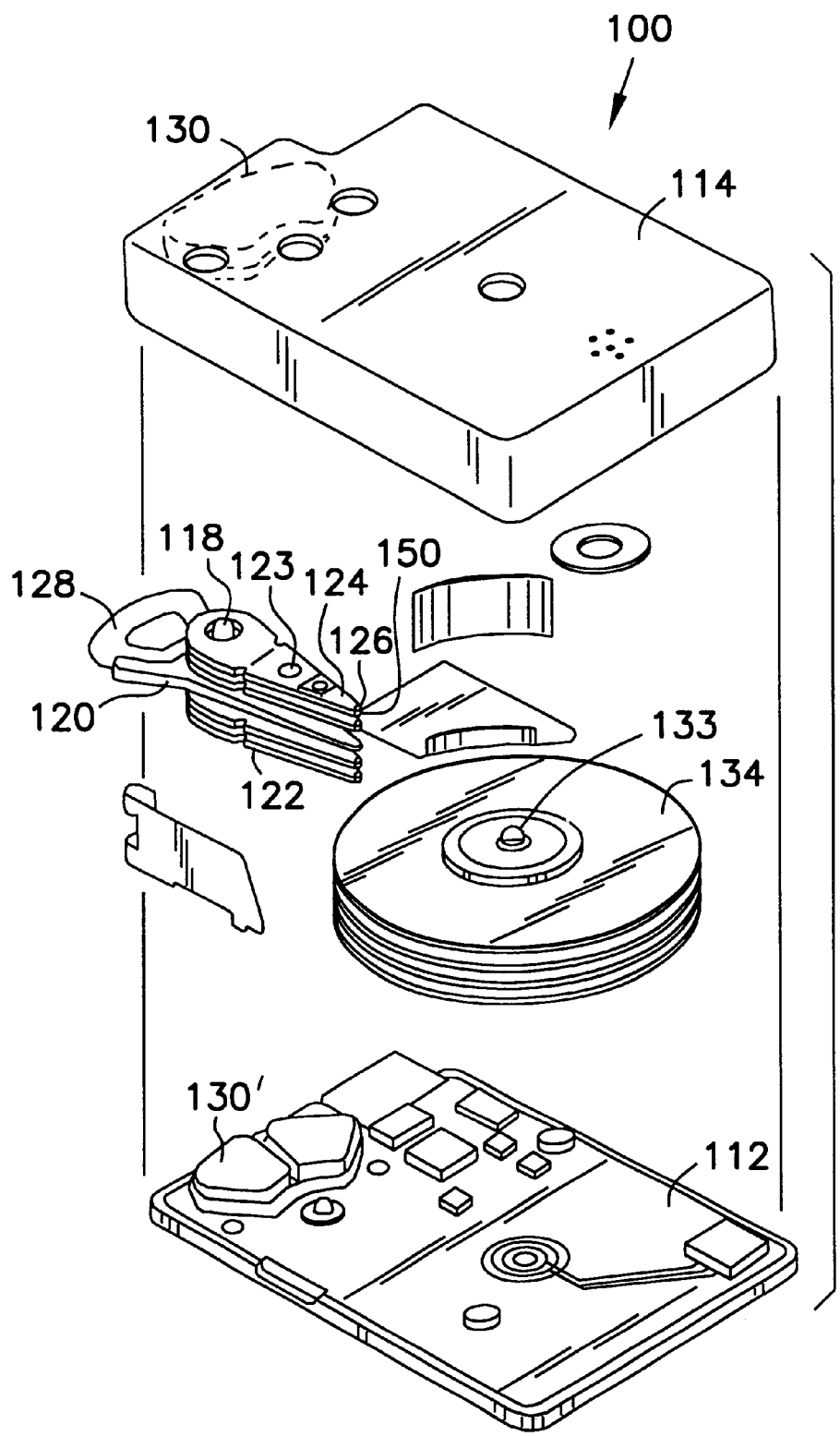
FIG. 1 is an exploded view of a disk drive with a multiple disk stack and a ramp assembly for loading and unloading transducers to and from the surfaces of the disks.

The invention described in this application is useful with all mechanical configurations of disk drives having either rotary or linear actuation. In addition, the invention is also useful in all types of disk drives including hard disk drives, zip drives, floppy disk drives and any other type of drives where unloading the transducer from a surface and parking the transducer may be desirable. FIG. 1 is an exploded view of one type of a disk drive 100 having a rotary actuator. The disk drive 100 includes a housing or base 112, and a cover 114. The base 112 and cover 114 form a disk enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer. Also attached to the load spring is a load tang 152. The load tang 152 is used for loading sliders 126 to the disk 134 and unloading the sliders 126 from the disk. On the end of the actuator arm assembly 120 opposite the load springs 124 and the sliders 126 is a voice coil 128.

Attached within the base 112 is a pair of magnets 130 and 130'. The pair of magnets 130 and 130', and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disk drive, the spindle motor is within the hub. In FIG. 1, a number of disks 134 are attached to the spindle hub 133. In other disk drives a single disk or a different number of disks may be attached to the hub. The invention described herein is equally applicable to such other disk drives.

Figure 2:
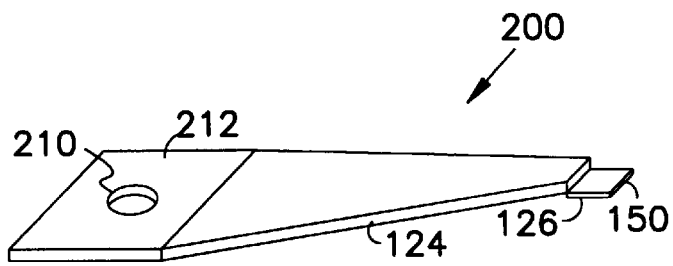
FIG. 2 is a perspective view of a load spring and an attached slider which form a head gimbal assembly.

FIG. 2 is a perspective view of a load spring 124 and attached slider 126 which form a head gimbal assembly 200. The load spring 124 is a triangular structure which acts as a cantilevered spring to place a small load onto the slider 126 when the slider 126 is in transducing relation with the disk 134. Load springs 124 are also commonly called load beams or suspensions by many in the disk drive industry. The load spring 124 is attached at its wider end to an actuator arm 123. The load spring 124 shown in FIG. 2 has a swage opening 210 and a swage plate 212 in the wider end. The swage opening 210 and swage plate 212 are used to attach the load spring 124 by a process referred to as swaging. Other attachment methods may also be used without departing from the spirit of this invention. Also attached to the load spring 124 is the slider 126. The transducer 150 is carried by or within the slider 126.

Moving the actuator assembly 120 moves all the load springs 124. In operation, the actuator assembly 120 is moved to a park position when the disk drive is powered down. Moving the actuator to the park position causes the sliders to move to a non-data area of the disk. The non-data area is typically at the inner diameter ("ID") of the disk 134. Once the actuator assembly 120 has moved the sliders 126 to the park position, the disk drive is powered down and the sliders land on the non-data area and skid to a halt. When the disk drive is powered on, the disks 134 are quickly accelerated until a relative velocity between the sliders 126 and the disk 134 is produced which causes the slider to lift off the surface of the disk 134. Once lift off of the slider 126 has occurred, the actuator assembly can be used to move the sliders 126 into an operating or transducing position over the area of the disk used to store information representative of data. The actuator assembly 120 can also be used to perform seeks to various data locations on the surface of the disk.

Figure 3A:
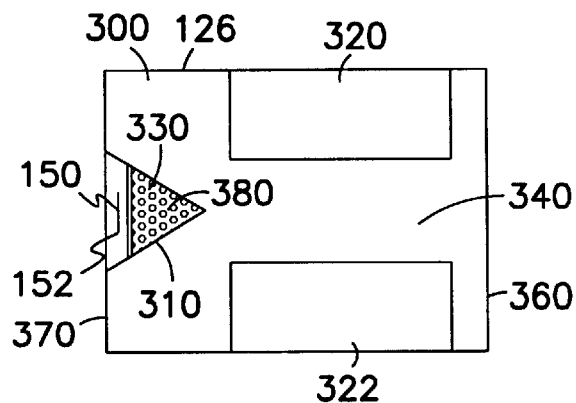
FIG. 3A is a bottom view of a slider showing the air-bearing surface with a center island.

FIG. 3A is a bottom view of a slider 126 showing an air-bearing surface 300. The air-bearing surface includes a center island 310, a first side rail 320 and a second side rail 322. The air-bearing surface 300 includes contact portions which contact the disk 134 during take-off and landing of the slider 126 and noncontact portions which do not normally contact the disk 134. The center island 310 is a contact portion 330. Other portions of the air-bearing surface such as the side rails 320 and 322 may also be contact portions. A cavity is typically formed between the side rails 320 and 322 as well as the center island 310. The cavity 340 is a noncontact portion of the air-bearing surface 300. The slider also has a leading edge 360 and a trailing edge 370. Positioned at or near the trailing edge 370 is the transducer 150. As shown in FIG. 3A, the transducer fits within a slot 152 within the center island 310.

Figure 3B:
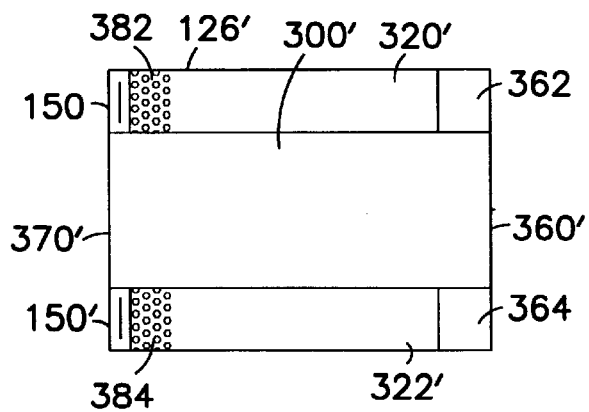
FIG. 3B is a bottom view of a slider showing the air-bearing surface having extended side rails and without a center island.

FIG. 3B is a bottom view of a slider 126' which has an air-bearing surface 300 with a slightly different design. In FIG. 3B, the side rails 320 and 322 are extended when compared to the air-bearing surface 300 shown in FIG. 3A. The air-bearing surface 300 shown in FIG. 3B does not include a center island portion. A cavity or depression 340 is formed between the first rail 320 and the second rail 322. The first rail 320 and the second rail 322 form the contact portion of the air-bearing surface 300'. The air-bearing surface 300' also includes a leading edge 360' and a trailing edge 370'. A transducer 150 is positioned near the trailing edge 370' of the slider 126' and at or near the surface of the first rail 320'. In some designs a transducer 150' may also be added to the second side rail 322'. The second transducer 150' is similarly positioned in the second side rail 322'. The leading edge 360' may include a leading edge taper 362 on the first side rail 320' and a leading edge taper 364 on the second side rail 322'. In each of FIGS. 3A and 3B, a portion of the contact surface of the air-bearing surface 300 or 300' is roughened, as depicted by reference numerals 380 in FIG. 3A and as depicted by reference numerals 382 and 384 in FIG. 3B. By roughening a portion of the contact surface of the air-bearing 300 or 300', the stiction forces between the slider 126 or 126' and the disk 134 are reduced when compared to a slider without a roughened contact surface.

It should be noted that only a portion of the contact surface 380, 382 or 384 needs to be roughened. The reason only a portion of the contact surface needs to be roughened is because the side rails 320 and 322 may include pads or patterns of diamond-like carbon, which are used to minimize stiction between the side rails 320 and 322 of the air-bearing surface 300 and the disk 134. These diamond-like carbon pads are generally placed so that they will not interfere with the spacing between the transducer 150 and the disk. As a result, the diamond-like pads will not interfere with the contact surface, such as 380, which is near the transducer 150. If the contact pads were placed too close to the transducer, the flying height of the transducer with respect to the disk 134 would be changed. Adding a roughened surface, such as 380, 382 or 384, reduces the stiction at the contact surface where there are no pads near the contact surface. The placement of the pads, as well as the pads themselves, are discussed in U.S. patent application Ser. No. 09/,188,400, entitled, "CAPPED POLYMERIC LOAD/UNLOAD PADS" which is assigned to Seagate Technologies, Inc., and also filed on a date even herewith.

There are several methods used to form a roughened contact surface, such as 380, 382, or 384. A random pattern of roughening can be formed by using a phase-selective etchant on a multi-phase material. A dry plasma etch can be used on any material and forms a more regular roughened pattern. These various techniques will now be discussed in the below paragraphs.

Sliders 126 and 126' have typically been made out of a multi-phase material. Sliders are made from a ceramic aluminum titanium carbide (AlTiC). A multi-phase material means that there is more than one component or phase of the material. For example, in a slider made of AlTiC, one of the components is the titanium carbide (TiC). Although sliders 126 have been made of multi-phase material in the past, sliders made of a single-phase material are being contemplated.

Formation of Roughened Surface on a Slider Made of Multi-Phase Material

Figure 4:
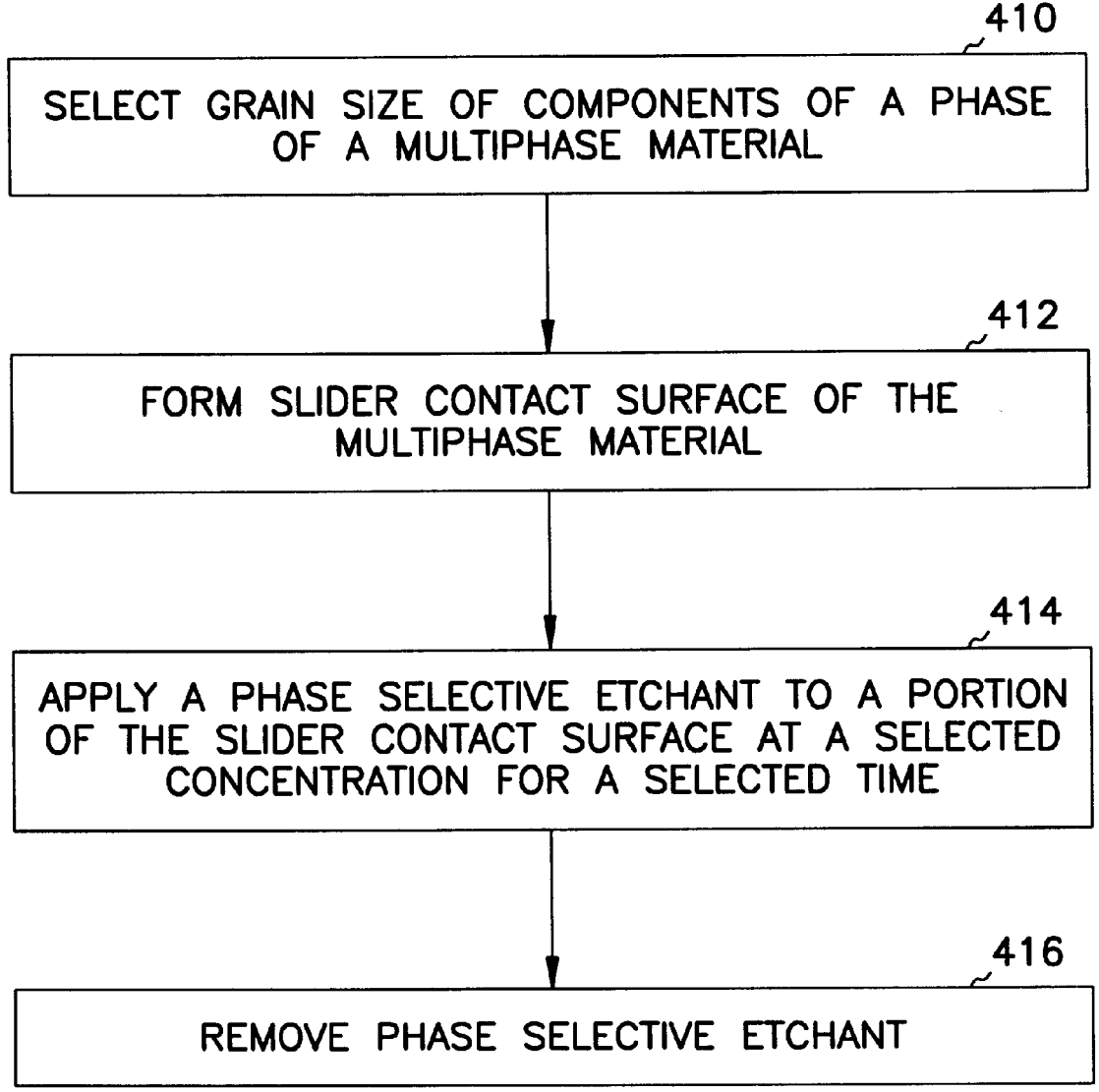
FIG. 4 is a flow chart showing the steps in applying the wet etch surface treatment to contact areas of the air-bearing surface of the slider.

In one preferred embodiment, the entire slider 126 is made of a multi-phase material, such as AlTiC and a phase-selective etchant is applied to a portion of the contact surface 380, 382 or 384 to produce a roughened surface. FIG. 4 is a flow diagram showing the steps in roughening an air-bearing surface 300 or 300' using this method. The initial step in using this method is to select the grain size of the components of a multi-phase material, as depicted by 410. AlTiC is a multi-phase material. The grain size of one of the phases is selected to determine the coarseness or roughness of the contact area 380, 382, or 384. In other words, the coarser the grain size, the rougher the contact area 380, 382 or 384 will be. Next, the slider contact surface 380, 382 or 384 is formed with the multi-phase material as shown by 412. The slider contact surface 380, 382 or 384 can be formed either by forming the entire slider out of a multi-phase material or, in the alternative, a portion of the contact surface can be removed and replaced with a multi-phase material. Next, a phase-selective etchant is applied to at least a portion of the slider contact surface 380, 382, or 384. The phase-selective etchant removes at least one component of the multi-phase material over time. For example, the phase-selective etchant such as nitric acid (HNO$_3$) is used to preferably etch the titanium carbide (TiC) from the AlTiC slider to cause the contact surface to develop a roughness greater than the original surface. The roughness can be controlled by controlling the concentration of the phase-selective etchant, as well as the amount of time the phase-selective etchant is applied to the multi-phase material, as shown by 414 in FIG. 4. In other words, if deeper grooves are to be made, a phase-selective etchant can be left on the contact area to be roughened, 380, 382 or 384 for a long time. Alternatively, the concentration of the phase-selective etchant can be increased so that the phase-selective etchant removes one of the components of the phase-selective material more quickly over the same amount of time. Once the phase-selective etchant has been applied to the contact surface 380, 382, or 384 for the selected amount of time, the phase-selective etchant is removed as shown by 416.

FIGS. 5A and 5B show the result of applying a phase-selective etchant to a multi-phase material. A center island 310 having a roughened contact surface 380 is shown in FIGS. 5A and 5B. It should be noted that other types and shapes of roughened surfaces could also be shown, such as the extended rail slider air-bearing surface 300' shown in FIG. 3B. It should also be understood that the surface treatment is equally applicable to all types of contact surfaces, 380, 382 and 384. The contact surface 330 that results is comprised of a roughened surface 380 and a smooth surface 500 which is positioned around the transducer 150. The transducer 150 is positioned within a slot 152 within the contact surface 330. The smooth portion 500 of the contact surface 330 is around the transducer 150 and the slot 152 in the contact surface 330. The transducer 150 is typically a magneto-resistive element used to read information from the disk. The slider 126 or 126' typically will have a write element, such as a thin film transducer, which is attached to the trailing edge 370 of the slider 126.

The roughened surface 380 of the contact surface 330 that results is a plurality of pebble-shaped elements 510. The pebble-shaped elements 510 are random in their orientation as well as in their spacing. The height of the pebble-shaped elements 510 is determined by the grain size of the phase of the multi-phase material which is unaffected or not as affected by the phase-selective etchant, the concentration of the phase-selective etchant, as well as the amount of time the phase-selective etchant is applied to the contact surface 330. By varying these factors, the size of the pebble-shaped elements 510 can be varied.

Formation of Roughened Surface Using Slider Made of a Single-Phase Material

Figure 6B:
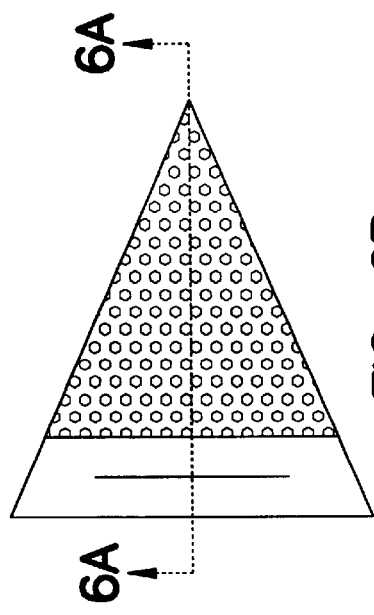
FIG. 6B is a top view of the center island portion of the slider air-bearing surface after having a portion of the center island removed.
Figure 6A:
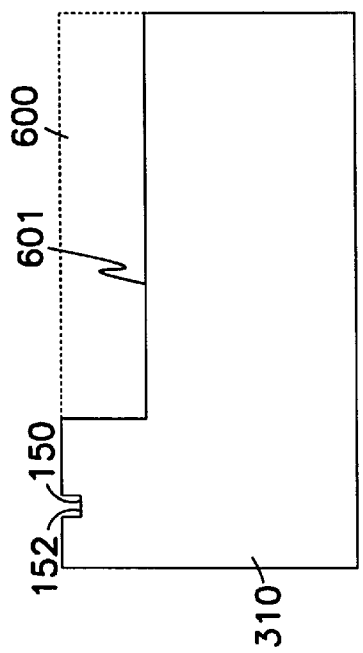
FIG. 6A is a cutaway side view along line 6A—6A of the center island portion of the slider air-bearing surface shown in FIG. 6B.

As mentioned previously, it is contemplated that sliders 126 or 126' may be made with a single-phase material, such as a single-phase ceramic. Initially, a portion of the center island 310 is removed, as shown by FIGS. 6A and 6B. FIG. 6A is a cut-away side view along 6A of the center island portion 310 of the slider air-bearing surface 300 shown in 6B. FIG. 6B is a top view of the center island portion 310 of the slider 126 air-bearing surface 300 after a portion of the center island 310 has been removed. The portion 600 that has been removed is also shown by dotted lines in FIG. 6A. The portion 600 that is removed forms a depression 601 on the center island 310. The material removed from the center island 310 to form the depression 601 is typically removed by ion milling.

Figure 7:
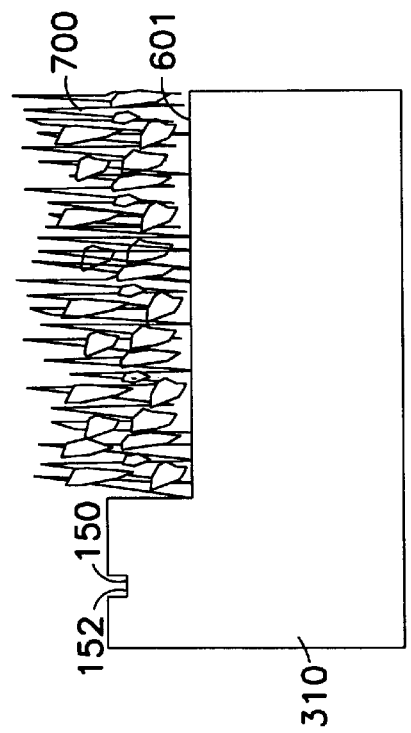
FIG. 7 is a cutaway side view of the center island portion of the slider air-bearing surface after a two-phase material has been deposited therein.

As shown in FIG. 7, a two-phase material 700 is deposited onto or into the depression 601. Again, the grain size of the multi-phase material can be selected to control the resulting roughness of the contact surface. As can be seen, the multi-phase material 700 is deposited to a height which is greater than the height of the original material which was removed. In other words, the multi-phase material 700 is added until the height of the material is higher than the transducer 150.

Figure 8:
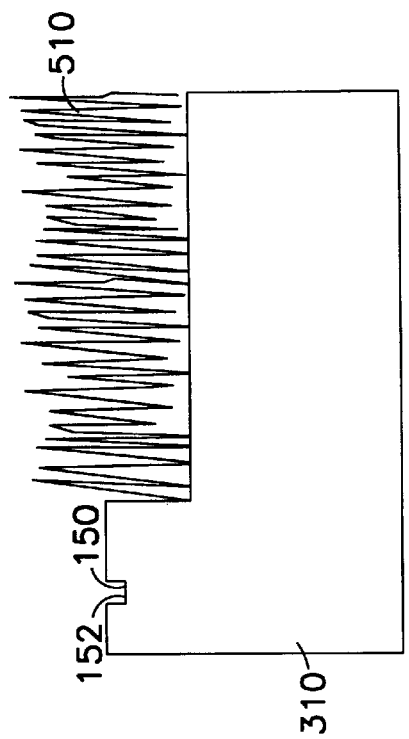
FIG. 8 is a cutaway side view of the center island portion of the slider air-bearing surface after applying a phase-selective etchant to remove a portion of the two-phase material.

A phase-selective etchant is then applied to the multi-phase material 700 for a selected amount of time and at a selected amount of concentration. FIG. 8 is a cutaway side view of the center island portion 310 of the air-bearing surface 300 after applying a phase-selective etchant to remove a portion of the two-phase material. The resultant structure is a series of pebble-shaped elements 510. The height of the pebble-shaped elements 510 is higher than the height of the portion of the contact surface in which the transducer 150 is positioned. Of course the height difference in FIG. 8 between the needle-like elements 510 and the surface in which the transducer 150 is positioned is exaggerated. However, an additional amount of protrusion of the texture with respect to the smooth surface 500 may be desirable to prevent the transducer 150 from contacting the disk surface 134.

Figure 9:
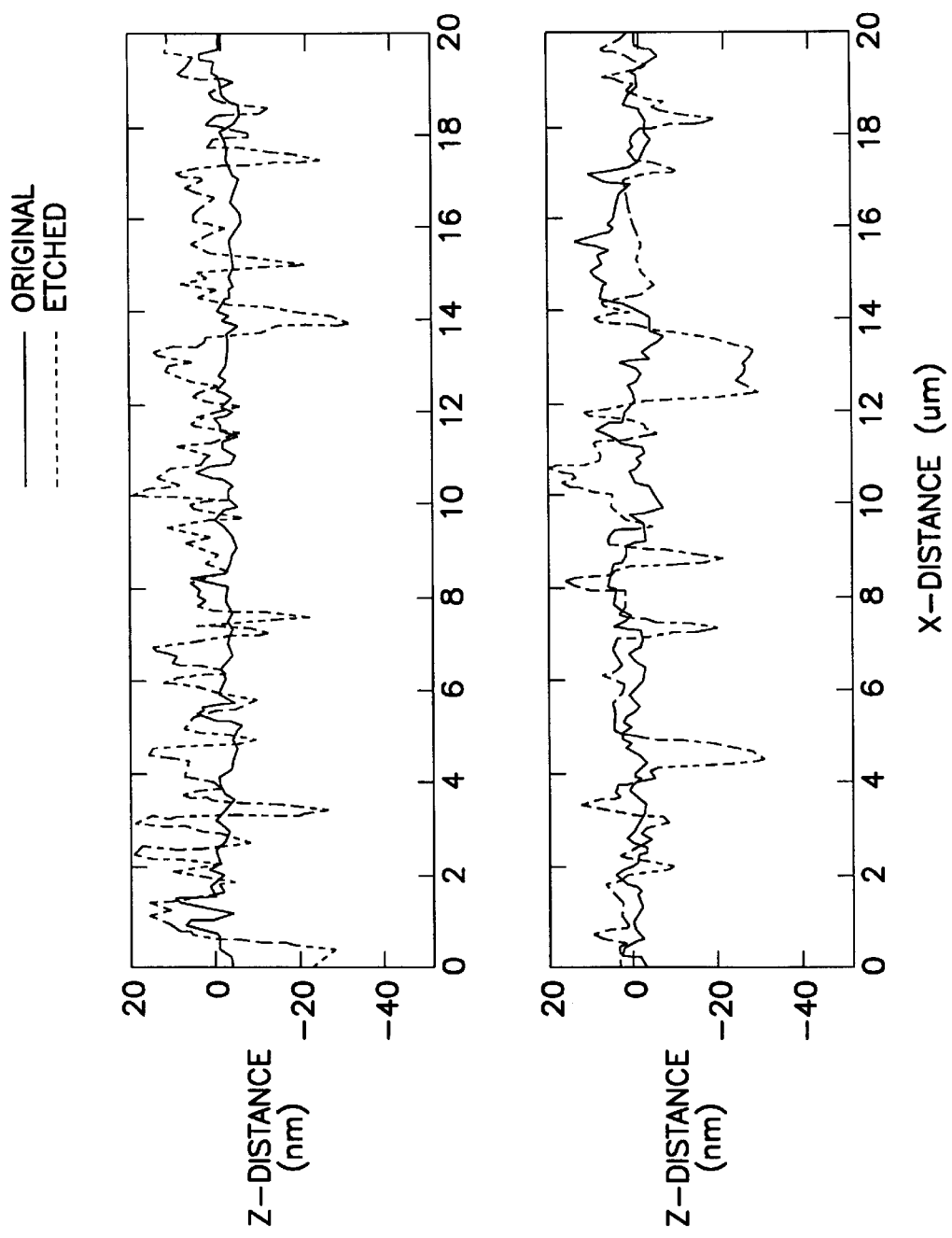
FIG. 9 is a set of graphs comparing the surface roughness before etching and after applying a phase-selective etchant to remove a portion of the two-phase material.

The result is a contact surface 380 which is rougher than the original surface. FIG. 9 shows a graph of the "Z" distance shown on the "Y" axis versus the "X" distance in two instances. The original line modulates around 0 and is graphed as shown. The other line shown is the "Z" distance versus the "X" distance for the contact surface 380 after it has been etched using a phase-selective etchant. Average values of some of the surface roughness parameters are provided in the following table.

| Surface Roughness Parameter- | Ra (nm) | Rq- (nm) | R ($\mu$m) | $\eta$ ($\mu m^{-2}$) | $\beta$ |
|---|---|---|---|---|---|
| Original | 2.0 | 2.3 | 2.5 | 10.0 | 0.058 |
| Etched | 9.0 | 11.0 | 0.8 | 5.0 | 0.044 |

Where
Ra = center line average of asperity heights
Rq = root mean square value (standard deviation of asperity heights)
R = average radius of curvature of asperity summits
$\eta$ = areal density of asperities
$\mu$ = roughness parameter Formation of Roughened Surface using Photolithography The roughened surface 380, 382, 384 can also be formed using photolithography to define a pattern. A first photolithographic process uses a mask to expose certain portions of a photoresist layer. A second photolithographic process uses a split laser beam to expose certain portions of a photoresist layer.

Formation of Roughened Surface Using Image Pattern

Figure 10A:
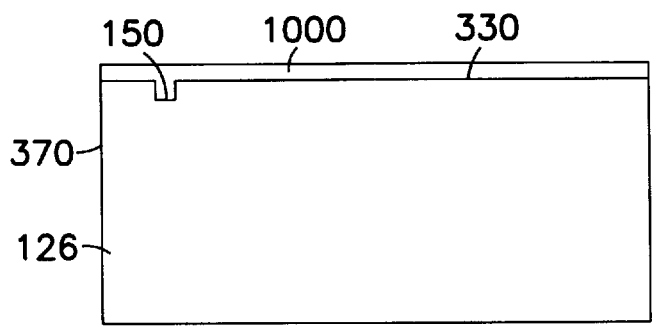
FIGS. 10A–10D show cross-sectional views of successive process steps for applying a surface treatment using photo-lithography and a dry or plasma etch to portions of the contact areas of the air-bearing surface of the slider in accordance with an embodiment of the invention.
Figure 10B:
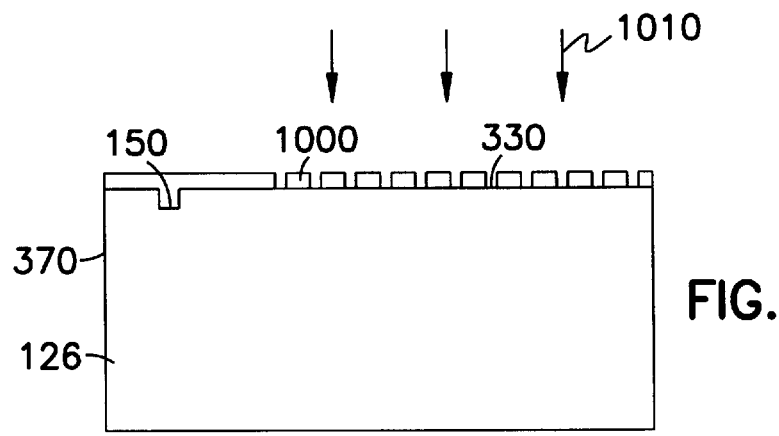

FIGS. 10A–10D show cross-sectional views of successive process steps for applying a roughening surface treatment using photolithography and a dry or plasma etch to portions of the contact surface 330 of the air-bearing surface 310 of the slider 126 in accordance with another embodiment of the invention. As shown in FIG. 10A, a photoresist 1000 is deposited as a continuous layer on contact surface 330. The photoresist is deposited as a continuous layer over the entire contact surface 330, including the transducer 150. The Photoresist can also be deposited as a continuous layer on the entire air-bearing surface 310 of the slider 126 which includes the contact surface 330. The photoresist is selectively irradiated, as depicted by the arrows 1010 shown in FIG. 10B, using a photo lithographic system, such as a step and repeat optical projection system, in which I-line ultraviolet light from a mercury-vapor lamp having a wavelength of 365 nm or DUV at 248 nm is projected through a first reticle and a focusing lens to obtain an image pattern. The image pattern used may be a grid or any other pattern. Thereafter, the photoresist is developed and the irradiated portions of the photoresist are removed to provide openings in photoresist, as is also shown in FIG. 10B. The resulting openings in the photoresist expose portions of contact surface 330 and define the pattern for the roughening of the contact surface 330 of the air-bearing surface 310.

Figure 10C:
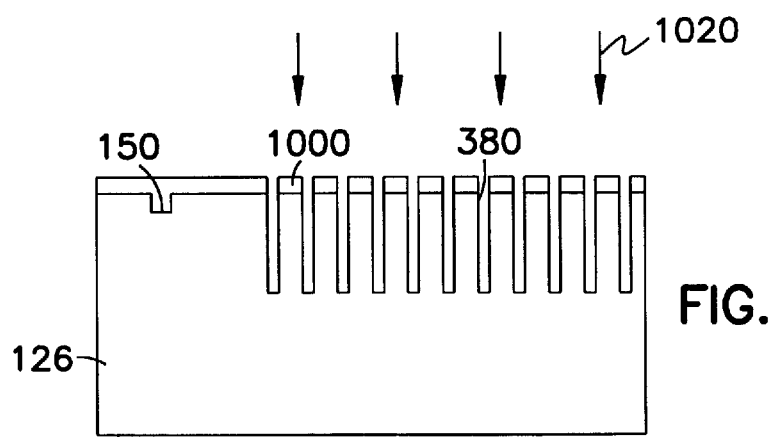

As shown by arrows 1020 in FIG. 10C, an etch is applied that removes some of the exposed portions of contact surface 330 to form the roughened surface 380. Various removal methods, as depicted by arrows in 1020, can be used to selectively remove the contact surface 330. Preferably, ion milling removes a portion of the contact surface 330 of the air-bearing surface 300 on the center island 310. A typical process for ion milling is to place the substrate onto an ion mill rotating table, where the angle of rotation can be varied so that the ion beam impinges on the surface at a controlled angle, ranging from 0 degrees (incidence normal to the ABS surface) to 90 degrees (incident ion beam traveling in the plane of the substrate ABS surface). Typical incident beam energy is 700 electron volts. A typical removal rate of unprotected ABS surface material is 100 nm/minute. Typical milling times are 1 to 3 minutes. Milling time is typically split between milling angles of 45 and 60 degrees according to a recipe selected to obtain the desired microtexture surface rounding. Various etchants, depicted by arrows 1020, can be used to selectively remove the contact surface 330. Preferably, a dry or plasma etch is applied that removes a portion of the contact surface 330 of the air-bearing surface 300 on the center island 310. The portion of the contact surface 330 covered by the remaining photoresist 1000 is subjected to the dry or plasma etch 1020 for a selected amount of time. Different plasmas may be used to dry or plasma etch the exposed portions of the contact surface 330. A different plasma may require a different amount of exposure time for removing a selected thickness of material at the contact surface 330. A different concentration of ions used in the same type of plasma may also require a different amount of exposure time to remove the exposed contact surface 330. The exposure time, the makeup of the plasma and the concentration of the ions used in the plasma may all be altered to vary the rate at which the material forming the contact surface 330 of the center island 310 of the slider 126 is removed. One example of an etchant is standard ion milling, applied for 3 minutes, in an ion mill chamber.

Figure 10D:
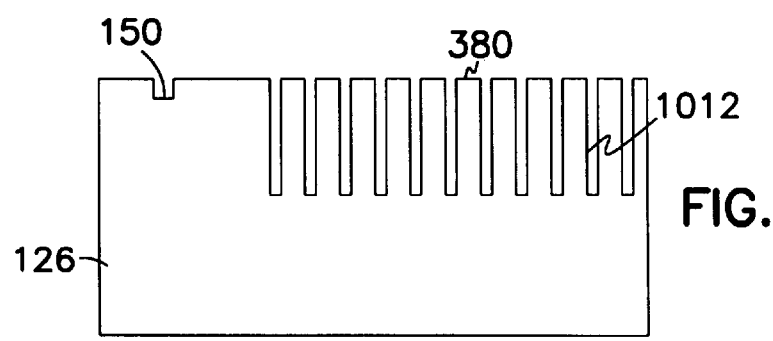

As shown in FIG. 10D, after a selected amount of the material is removed from the slider 126 at and near the contact surface 330 with the dry or plasma etch, the remaining photoresist 1000 is stripped (not shown in FIG. 10D). This results in a roughened contact surface 380 portion 330 on the air-bearing surface 300. The pattern is typically a grid of columns which have a square or diamond cross section. The dry or plasma etch is used in this process since vertical edges 1012 can be made or defined without the undercutting problems associated with wet etch processes. Using this method, the pitch of the pattern generated is limited since the pattern which can be projected by the photolithographic system, such as a step and repeat optical projection system, in which 248 nm ultraviolet light from a mercury-vapor lamp projected through a first reticle and a focusing lens is limited to an image pattern having a pitch of 0.4 $\mu$m. The image pattern used may be a grid or any other pattern. The result is a set of columns 1011 having edges 1012. The roughened contact surface 380 includes these columns. Using this method, surface roughnesses in the range of approximately 1 to 12 nm are achievable.

Formation of Roughened Surface Using Split Laser

According to another embodiment of this invention, the grid pattern on the photoresist is defined by a split laser, rather than by the photolithographic system which uses a step-and-repeat optical projector system in which an I-line ultra-violet light from a mercury vapor lamp or DUV from an excimer laser source is projected through a first reticle and a focusing lens. Use of a laser provides for a much finer pitch pattern, which is formed in the photoresist. The process associated with forming the roughened surface 380, namely the exposure of the photoresist to light as depicted by arrows 1010 in FIG. 10B, is conducted by the split-laser apparatus 1100 shown in FIG. 11. The remaining portions of the photo lithographic process depicted by FIGS. 10A to 10D are the same. Rather than repeat the entire process or description of FIGS. 10A to 10D, the below discussion will focus on the differences between the process for using a split laser and the process which uses the other photolithographic system to expose the photoresist 1000.

Figure 11:
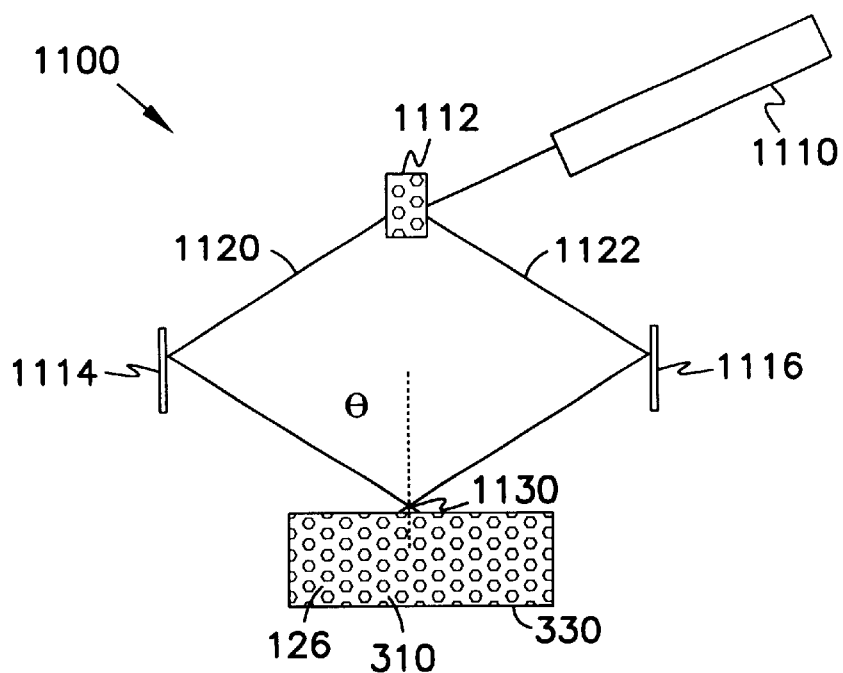
FIG. 11 is a schematic of an apparatus used to expose the photoresist to apply a fine-pitched surface treatment to the slider.

FIG. 11 is a schematic of an apparatus 1100 used to expose the photoresist 1000 and to apply a fine-pitched surface treatment to the contact surface 330 of the center island 310 of the air-bearing surface 300. The apparatus 1100 includes an ultra-violet (UV) laser 1110, a beam splitter 1112, a first split-beam director 1114 and a second split-beam director 1116. The UV laser 1110 produces lazed light directed at the beam splitter 1112. At the beam splitter 1112, the lazed light is divided into a first laser beam 1120 and a second laser beam 1122. The first beam of lazed light 1120 is directed to the first split-beam director 1114 and the second beam of lazed light 1122 is directed to the second split-beam director 1116. The first split-beam director 1114 directs the first beam 1120 to the contact surface 330 of the island 310 of the substrate 126. Similarly, the second split-beam director 116 directs the second bean of lazed light 1122 toward the contact surface 330 of the center island 310 of the slider 126. The contact surface 330 of the air-bearing surface 300 is coated with a negative-acting or positive-acting photoresist sensitive to deep ultraviolet irradiation. The resist thickness is approximately twice the pitch of the fine pattern which will be formed. The first beam of lazed light 1120 and the second beam of lazed light 1122 interfere at the surface 330 of the center island 310. Portions of the lazed light interfere and cancel and other portions of the lazed light constructively add together to form an array of light at the contact surface 330. The pitch of the pattern along a line in the plane of the intersecting laser beams 1120 and 1122, and the substrate surface or contact surface 330 is $$Pitch = \frac{LaserWavelength}{2*\sin(\theta)}$$

where $\theta$ is the laser irradiation angle of incidence with respect to the vector, normal to the substrate or contact surface 330 of the center island 310 of the air-bearing surface 300 of the slider 126. The vector is shown as a dotted line carrying the reference numeral 1140. Using the conventional UV-sensitive resists, a pattern pitch of 200 nanometers (nm) is readily achieved. Using DUV resists and an excimer laser, a pattern pitch as small as 100 nm is achievable.

The contact surface 330 is exposed two times. The second exposure is done after the slider and center island 310 have been rotated through a number of degrees. Preferably, the substrate or contact surface of the center island 310 is rotated through 90 degrees so that columns having a square shape are formed. The substrate or center island 310 could be rotated through an angle more or less than 90 degrees to form a series of columns having diamond-like cross sections. The resist is developed and a conventional etch process, such as ion milling or a dry or plasma etch is used to remove some of the material at or near the contact surface. The roughened surface 380 is formed after the resist is then removed.

Advantageously, a roughened portion of the contact surface reduces the stiction forces produced between the surface of the disk and the slider and allows landing of a slider onto a smooth disk. Advantageously, since a smooth disk can be used the spacing between the transducing head associated with the slider and the disk can be controlled and kept to a minimum to provide for an enhanced recording density of the information stored on the disk. The roughened contact area of the air-bearing surface not only reduces stiction forces between the disk and the slider, but it also provides a stable air-bearing surface for the slider. The resulting air-bearing is rugged and durable. The materials used to form the roughened surface are removed so the only materials remaining are those already in the drive. Thus, outgassing problems are minimal.

Figure 12:
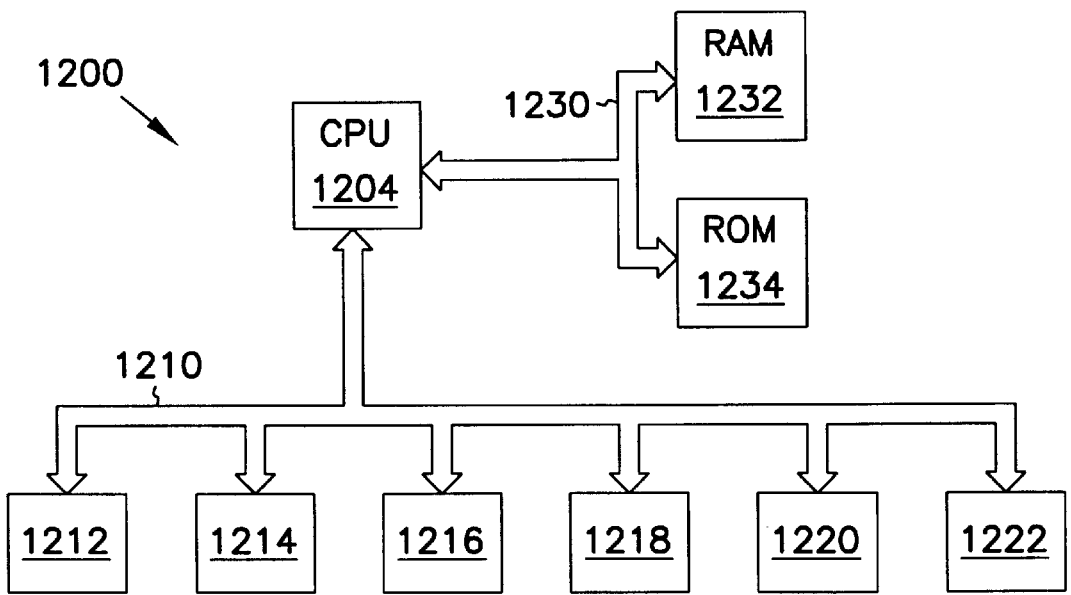
FIG. 12 is a schematic view of a computer system.

FIG. 12 is a schematic view of a computer system. Advantageously, the invention is well-suited for use in a computer system 1200. The computer system 1200 may also be called an electronic system or an information handling system and includes a central processing unit, a memory and a system bus. The information handling system includes a central processing unit 1204, a random access memory 1232, and a system bus 1230 for communicatively coupling the central processing unit 1204 and the random access memory 1232. The information handling system 1202 includes a disk drive device which includes the ramp described above. The information handling system 1202 may also include an input/output bus 1210 and several devices peripheral devices, such as 1212, 1214, 1216, 1218, 1220, and 1222 may be attached to the input output bus 1210. Peripheral devices may include hard disk drives, magneto optical drives, floppy disk drives, monitors, keyboards and other such peripherals. Any type of disk drive may use the slider having the surface treatment discussed above.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A slider for a disk drive information handling system comprising:
    a transducer associated with the slider;
    an air-bearing surface further comprised of:
        a contact surface; and
        a non-contact surface, at least a portion of the contact surface positioned near the transducer associated with the slider; and
    means for reducing stiction associated with said contact surface.

2. The slider of claim 1 wherein the air bearing surface is further comprised of at least one rail having a rail surface, wherein means for reducing stiction includes a roughened rail surface portion positioned near the trailing edge of the slider.

3. The slider of claim 2 wherein the roughened rail surface portion is formed using photolithography and dry plasma etching.

4. The slider of claim 2 wherein the roughened rail surface portion is formed using a phase-selective etchant.

5. The slider of claim 2 wherein the roughened center pad contact surface has a surface roughness, $R_a$, defined by the center line average of asperity heights in the range of 0.25 nm to 1000 nm.

6. The slider of claim 2 wherein the roughened rail surface portion has a surface roughness, $R_a$, defined by the center line average of asperity heights in the range of 1 nm to 12 nm.

7. A slider for a disc drive comprising:
    a leading edge;
    a trailing edge;
    a transducer positioned near the trailing edge of the slider;
    an air bearing surface further including:
        a first rail having a first rail surface; and
        a second rail having a second rail surface, wherein at least one of the first rail surface and the second rail surface is roughened and has asperities which extend into the at least one of the first rail surface and the second rail surface, the at least one of the first rail surface and the second rail surface
        being roughened to reduce the friction between the slider and any surface the slider contacts.

8. The slider of claim 7 wherein the air bearing surface of the slider further comprises:

a first side rail, having a first rail surface portion proximate the trailing edge; and a second side rail, having a second rail surface portion proximate the trailing edge, wherein at least one of the first rail surface portion or the second rail surface portion being roughened is near the trailing edge of the slider.

9. The slider of claim 7 wherein the slider is formed of a multiphase material.

10. The slider of claim 7 wherein a portion of the slider being roughened is formed of a multiphase material.

11. The slider of claim 7 further comprising a center island having a center island surface substantially coplanar with the first rail surface and the second rail surface, wherein the center island is roughened and has asperities which extend into the center island surface.

12. The slider of claim 11 wherein the portion of the center island being roughened is comprised of multiphase material.

13. The slider of claim 7 wherein the roughened portion of the at least one of the first rail surface and the second rail surface has a surface roughness, $R_a$, defined by the center line average of asperity heights in the range of 1 nm to 12 nm.

14. The slider of claim 7 wherein the roughened portion of the at least one of the first rail surface and the second rail surface has a surface roughness, $R_a$, defined by the center line average of asperity heights in the range of 0.25 nm to 1000 nm.

15. A disc drive comprising:

a base;

a disc rotatably attached to the base, the disc having a major surface;

an actuator; and a slider attached to the actuator, the actuator for placing the slider into a transducing position over the major surface of the disc, the slider further including:
a leading edge;
a trailing edge;
a transducer positioned near the trailing edge associated with the slider; and
an air bearing surface further including
a non-contact area; and
a contact area further including a rail surface terminating at the trailing edge of the slider, the rail surface being roughened to reduce the friction between the slider and any surface the slider contacts.

16. The disc drive of claim 15 wherein the rail surface is comprised of at least one of a first side rail, a second side rail, or a center pad.

17. The disc drive of claim 15 wherein the slider further comprises a transducer, the contact area proximate the transducer.

18. The disc drive of claim 15 wherein the air bearing surface of the slider further comprises:

a first side rail, having a first portion of the contact area proximate the trailing edge; and a second side rail, having a second portion of the contact area proximate the trailing edge.

19. The disc drive of claim 15 wherein the contact area of the air bearing surface of the slider is located proximate the trailing edge of the slider.

20. The slider of claim 1 wherein the contact surface is further comprised of at least one rail contact surface which terminates at the trailing edge of the slider, wherein means for reducing stiction includes a roughened rail contact surface positioned near the trailing edge of the slider.

21. The slider of claim 20 wherein the roughened rail contact surface has a surface roughness, $R_a$, defined by the center line average of asperity heights in the range of 0.25 nm to 1000 nm.

22. The slider of claim 20 wherein the roughened rail contact surface has a surface roughness, $R_a$, defined by the center line average of asperity heights in the range of 1 nm to 12 nm.

23. The slider of claim 20 wherein the at least one rail includes a pad projecting from the rail, the roughened rail contact surface positioned near the trailing edge of the slider and positioned between the pad and the trailing edge of the slider.

24. A slider for a disc drive comprising:

a leading edge;

a trailing edge;

a transducer positioned associated with the slider; and an air bearing surface further including:
a first rail having a first rail surface;
a second rail having a second rail surface; and
a center island having a center island surface;
a non-contact area; and
a contact area, the contact area further including at least one rail terminating at the trailing edge of a slider, a roughened rail contact surface associated with the rail and positioned near the trailing edge of the slider to reduce the friction between the slider and any surface the slider contacts.

25. The slider of claim 24, wherein the at least one rail includes a pad projecting from the rail, the roughened rail contact surface positioned between the pad and the trailing edge of the slider.

26. A disc drive comprising:

a base;

a disc rotatably attached to the base, the disc having a major surface;

an actuator; and a slider attached to the actuator, the actuator for placing the slider into a transducing position over the major surface of the disc, the slider further including:
a leading edge;
a trailing edge;
a transducer positioned near the trailing edge of the slider; and
an air bearing surface further including:
a first rail surface; and
a second rail surface, the first rail surface and the second rail surface including
a contact area, the contact area further including asperities which extend into the surface of at least one of the first rail surface or the second rail surface to reduce the friction between the slider and any surface the slider contacts.

27. The disc drive of claim 26 wherein the contact area is proximate the transducer.

28. The disc drive of claim 26, wherein the air bearing surface further includes a pad positioned on the rail and projecting from the rail, the roughened contact surface positioned between the pad and the trailing edge.

* * * * *